(12) United States Patent
Hosotani

(10) Patent No.: US 9,397,575 B2
(45) Date of Patent: Jul. 19, 2016

(54) SWITCHING POWER SUPPLY DEVICE

(71) Applicant: Murata Manufacturing Co., Ltd., Nagaokakyo-shi, Kyoto-fu (JP)

(72) Inventor: Tatsuya Hosotani, Nagaokakyo (JP)

(73) Assignee: Murata Manufacturing Co., Ltd., Nagaokakyo-shi (JP)

( * ) Notice: Subject to any disclaimer, the term of this patent is extended or adjusted under 35 U.S.C. 154(b) by 216 days.

(21) Appl. No.: 14/176,405

(22) Filed: Feb. 10, 2014

(65) Prior Publication Data
US 2014/0254207 A1    Sep. 11, 2014

Related U.S. Application Data

(63) Continuation of application No. PCT/JP2012/069424, filed on Jul. 31, 2012.

(30) Foreign Application Priority Data

Aug. 11, 2011   (JP) .................................. 2011-175803

(51) Int. Cl.
   *H02M 3/335*   (2006.01)
   *H02M 3/338*   (2006.01)
(52) U.S. Cl.
   CPC ........ *H02M 3/33507* (2013.01); *H02M 3/3385* (2013.01); *H02M 3/33569* (2013.01)
(58) Field of Classification Search
   CPC ............ H02M 3/335; H02M 3/33507; H02M 3/33569; H02M 3/3385
   See application file for complete search history.

(56) References Cited

U.S. PATENT DOCUMENTS

| | | | |
|---|---|---|---|
| 6,172,883 B1 * | 1/2001 | Kates | H02M 3/33561 363/21.18 |
| 6,201,713 B1 | 3/2001 | Hosotani | |
| 2002/0080634 A1 | 6/2002 | Nozawa et al. | |
| 2008/0112192 A1 | 5/2008 | Nishikawa | |
| 2008/0219033 A1 | 9/2008 | Nishikawa | |

(Continued)

FOREIGN PATENT DOCUMENTS

| | | |
|---|---|---|
| JP | 8-289542 A | 11/1996 |
| JP | 2001-37220 A | 2/2001 |

(Continued)

OTHER PUBLICATIONS

Official Communication issued in corresponding Japanese Patent Application No. 2013-527969, mailed on Sep. 24, 2014.

(Continued)

*Primary Examiner* — Matthew Nguyen
(74) *Attorney, Agent, or Firm* — Keating & Bennett, LLP

(57) ABSTRACT

In a switching power supply device, a voltage of a counter electromotive force induced in a drive winding as a high side switching element is turned off is output to a ZT terminal of a switching control IC, and thus an OUT terminal of the switching control IC is brought to a high level, and thus a low side switching element is turned on. A constant current circuit charges a capacitor with a constant current through a voltage at the OUT terminal. A comparator in the switching control IC inverts the voltage at the OUT terminal to a low level upon a voltage at an IS terminal exceeding a voltage at an FB terminal. Thus, an on time of the low side switching element is controlled in accordance with a voltage output to the FB terminal, and an output voltage Vo is turned into a constant voltage.

19 Claims, 14 Drawing Sheets

(56) References Cited

U.S. PATENT DOCUMENTS

| | | |
|---|---|---|
| 2008/0291702 A1 | 11/2008 | Hosotani |
| 2011/0085354 A1* | 4/2011 | Wang .................. H02M 1/4225 363/21.02 |
| 2012/0033454 A1 | 2/2012 | Hosotani et al. |
| 2012/0033455 A1 | 2/2012 | Hosotani et al. |
| 2012/0063174 A1* | 3/2012 | Kuwabara ........... H02M 1/4225 363/21.02 |
| 2012/0314454 A1 | 12/2012 | Hosotani |
| 2012/0314458 A1 | 12/2012 | Hosotani |

FOREIGN PATENT DOCUMENTS

| | | |
|---|---|---|
| JP | 2002-209381 A | 7/2002 |
| JP | 2005-278376 A | 10/2005 |
| JP | 2006-109566 A | 4/2006 |
| JP | 2008-125217 A | 5/2008 |
| JP | 2008-228382 A | 9/2008 |
| JP | 2008-289336 A | 11/2008 |
| JP | 2011/105258 A1 | 9/2011 |
| JP | 2011/111483 A1 | 9/2011 |
| WO | 2010/119760 A1 | 10/2010 |
| WO | 2010/119761 A1 | 10/2010 |
| WO | 2011/105258 A1 | 9/2011 |
| WO | 2011111483 A1 | 9/2011 |

OTHER PUBLICATIONS

Official Communication issued in International Patent Application No. PCT/JP2012/069424, mailed on Oct. 30, 2012.

* cited by examiner

SWITCHING POWER SUPPLY DEVICE

BACKGROUND OF THE INVENTION

1. Field of the Invention

The present invention relates to switching power supply devices that include switching elements and switching control circuits. In particular, the present invention makes it possible to apply a general purpose current mode IC to a high performance power conversion circuit.

2. Description of the Related Art

FIG. 1 is a circuit diagram of a switching power supply device described in Japanese Unexamined Patent Application Publication No. 2001-37220. In FIG. 1, a switching power supply device 1 is based on a flyback converter circuit, and a primary switching element Q1 is turned on and off in an alternating manner. When the primary switching element Q1 is on, energy is accumulated in a transformer T, and when the primary switching element Q1 is off, power is supplied to a load. In addition, the switching power supply device 1 employs a so-called voltage clamp system, in which a surge voltage that is applied to the primary switching element Q1 is clamped, and this achieves a zero voltage switching operation of the primary switching element Q1 and a secondary switching element Q2.

Specifically, in the switching power supply device 1, an FET Q1, which serves as the primary switching element, a primary winding N1 of the transformer T, and a direct current power supply E are connected in series, and a series circuit formed by an FET Q2, which serves as the secondary switching element, and a capacitor C1 is connected between the two ends of the primary winding N1 of the transformer T.

Here, a gate of the FET Q1 is connected to one end of a first drive winding N3 via a switching control IC 2. In addition, a source of the FET Q2 is connected to a drain of the FET Q1, and a gate of the FET Q2 is connected to one end of a second drive winding N4 of the transformer T via a secondary switching element control circuit (secondary control circuit) 3.

Furthermore, the gate and the source of the FET Q2 are connected between the two ends of the second drive winding N4 via the secondary control circuit 3. The secondary control circuit 3 includes a transistor Q3, a capacitor C2, a resistor R1, a capacitor C3, a resistor R2, and an inductor 4. Of these components, the capacitor C2 and the resistor R1 form a time constant circuit.

In addition, the switching power supply device 1 includes a rectifying diode Do and a smoothing capacitor C4, which are provided at a secondary side of the transformer T.

If the switching control IC 2 as illustrated in FIG. 1 is prepared for each of the variety of applications in a power conversion circuit and a different IC is used for a different specification or a different purpose, a large variety of ICs become necessary with an increase in the number of applications. The development and the manufacture of an individual IC require considerable processes and costs. The increase in the variety also complicates the logistics and the inventory management of the ICs, which results in a problem that the unit cost of the ICs increases.

In particular, in a current resonance type power conversion circuit having a half bridge configuration that uses two switching elements or in an insulating type power conversion circuit having a power factor correction function (PFC converter), the waveform of a current that flows in the power conversion circuit does not necessarily take on such a waveform in which a current value increases monotonously in proportion to time during an on period in which the electricity runs in the switching element, which leads to an issue that a general purpose current mode IC cannot be used.

SUMMARY OF THE INVENTION

Preferred embodiments of the present invention provide a switching power supply device in which an entire circuit is configured simply without providing individual switching control ICs for respective circuit configurations in the switching power supply device.

A switching power supply device according to a preferred embodiment of the present invention includes a power supply voltage input unit configured to accept input of an input power supply voltage, a direct current voltage output unit configured to receive output of a direct current voltage, a transformer including a primary winding and a secondary winding, a low side switching element connected in series to the primary winding and configured to apply a voltage at the power supply voltage input unit to the primary winding upon being turned on, a switching control circuit configured to control the low side switching element, a rectifying smoothing circuit configured to rectify and smooth a voltage output from the secondary winding and output an output voltage to the direct current voltage output unit, and a feedback voltage signal generating circuit configured to generate a feedback voltage signal on the basis of the output voltage.

The switching control circuit includes a drive voltage signal output unit configured to output, upon detecting an inversion of a voltage polarity in the transformer, a drive voltage signal that causes the low side switching element to turn on, a reference voltage generating circuit configured to generate a reference voltage (e.g., a triangular wave voltage signal) of which a voltage changes along with a time that has elapsed since the drive voltage signal has been output, and a turn off control unit configured to switch the drive voltage signal to a voltage at which the low side switching element is turned off, in response to the reference voltage reaching the feedback voltage signal.

It is preferable that the transformer includes a low side drive winding, and that the drive voltage signal output unit be configured to detect the inversion of the voltage polarity in the transformer on the basis of a voltage at the low side drive winding.

It is preferable that the reference voltage generating circuit includes a capacitor and a constant current circuit configured to charge the capacitor with a constant or substantially constant current in accordance with the drive voltage signal, and that a circuit configured to discharge an electric charge from the capacitor through a voltage of the drive voltage signal that causes the low side switching element to turn off be provided.

If a PFC converter is to be provided, a full wave rectifying circuit configured to accept input of a commercial alternate current power supply voltage and rectify the full waves of the commercial alternate current power supply voltage is provided, and an output voltage of the full wave rectifying circuit is input to the power supply voltage input unit.

It is preferable that the transformer include a high side drive winding, and that a high side switching element control circuit configured to control the low side switching element and the high side switching element such that each of the two switching elements is turned on or off in an alternating manner with a slight dead time during which the two switching elements are both being turned off be provided.

If a converter that includes the high side switching element and the low side switching element is to be provided, it is preferable that the high side switching element control circuit include a turn on signal transmitting circuit configured to supply a voltage generated in the high side drive winding to a control terminal of the high side switching element so as to turn on the high side switching element upon the low side switching element being turned off, a bidirectional constant current charge-discharge circuit connected to the high side drive winding and configured to turn the voltage generated in the high side drive winding into a constant current and charge or discharge a capacitor with the constant current, and a switching element configured to turn off the high side switching element by shifting a state upon a voltage at the capacitor charged by a voltage induced in the high side drive winding exceeding a threshold value during an off time of the low side switching element.

It is preferable that a rectifying smoothing circuit configured to rectify and smooth a voltage generated in the low side drive winding to generate a direct current power supply voltage to be supplied to the switching control circuit be provided in the low side drive winding.

According to various preferred embodiments of the present invention, a single type of control IC is configured to be used in a variety of power conversion circuits of a switching power supply device thus eliminating the need to provide individual switching control ICs for the respective configurations in the power conversion circuits of the switching power supply device, which makes it possible to simplify the configuration of the entire circuit.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A switching power supply device according to a first preferred embodiment of the present invention will be described with reference to FIGS. 2 to 4.

Figure 1:
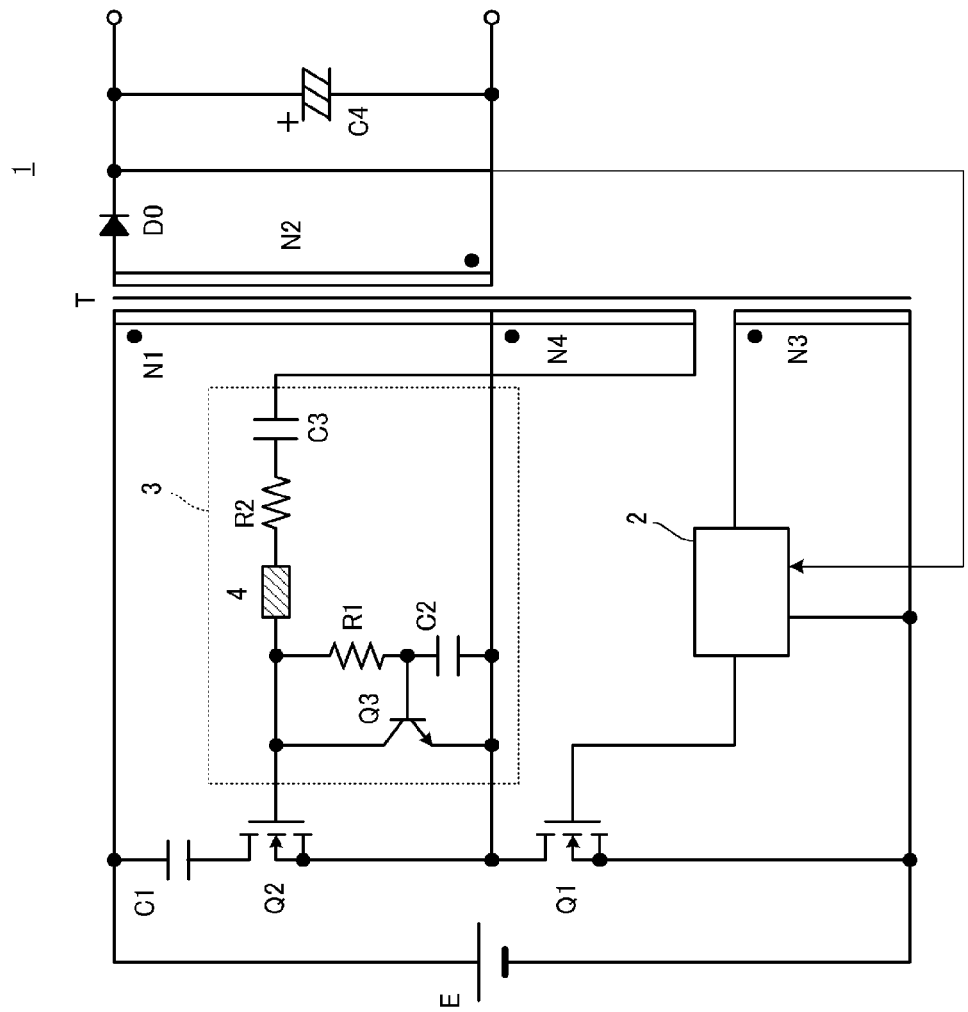
FIG. 1 is a circuit diagram of a switching power supply device described in Japanese Unexamined Patent Application Publication No. 2001-37220.
Figure 2:
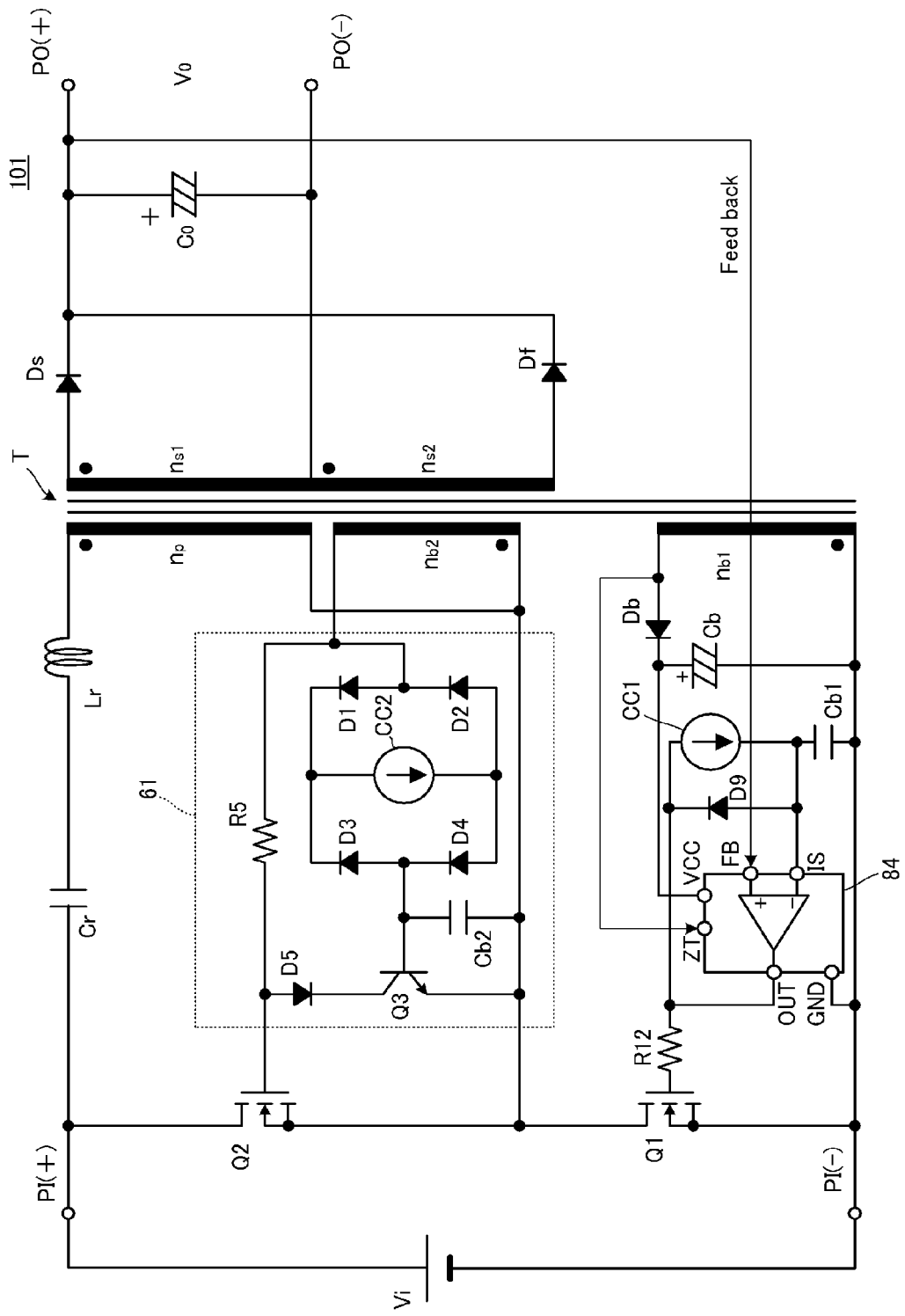
FIG. 2 is a circuit diagram of a switching power supply device 101 according to a first preferred embodiment of the present invention.

FIG. 2 is a circuit diagram of a switching power supply device 101 according to the first preferred embodiment. A voltage of a direct current input power supply Vi is input between input terminals PI(+) and PI(−) of the switching power supply device 101. Then, a predetermined direct current voltage is output to a load Ro that is connected between output terminals PO(+) and PO(−) of the switching power supply device 101.

A first series circuit, in which a capacitor Cr, an inductor Lr, a primary winding np of a transformer T, and a low side switching element Q1 are connected in series, is provided between the input terminals PI(+) and PI(−). The low side switching element Q1 preferably is an FET, and a drain terminal thereof is connected to the primary winding np of the transformer T.

A second series circuit, in which a high side switching element Q2, the capacitor Cr, and the inductor Lr are connected in series, is provided between the two ends of the primary winding np of the transformer T.

A first rectifying smoothing circuit, which preferably includes diodes Ds and Df and a capacitor Co, is provided on secondary windings ns1 and ns2 of the transformer T. This first rectifying smoothing circuit rectifies and smoothes the full waves of an alternate current voltage that is output from the secondary windings ns1 and ns2 and outputs the result to the output terminals PO(+) and PO(−).

The transformer T includes not only the primary winding np and the secondary windings ns1 and ns2 but also a low side drive winding nb1 and a high side drive winding nb2.

A rectifying smoothing circuit, which preferably includes a diode Db and a capacitor Cb, is connected to the low side drive winding nb1 of the transformer T. A direct current voltage obtained through this rectifying smoothing circuit is supplied to a VCC terminal of a switching control IC 84 as a power supply voltage.

The switching control IC 84 is a typical general purpose IC that includes an IS terminal (current detection terminal) and operates in a current mode.

A feedback circuit is provided between the output terminals PO(+) and PO(−) and the switching control IC 84. In FIG. 2, only a feedback path is indicated simply by a single line (Feed back). Specifically, however, a feedback signal is generated through a comparison of a divided voltage value of an output voltage Vo between the output terminals PO(+) and PO(−) against a reference voltage, and a feedback voltage is input to an FB terminal of the switching control IC 84 in an insulated state. The feedback voltage that is input to the FB terminal is higher as the output voltage Vo is lower.

A series circuit, which preferably includes a constant current circuit CC1 and a capacitor Cb1, is connected to an OUT terminal of the switching control IC 84 such that a charge voltage of the capacitor Cb1 is input to the IS terminal (current detection terminal).

In response to a voltage of a counter electromotive force that is induced in the low side drive winding nb1 as the high side switching element Q2 is turned off being input to a ZT terminal (zero voltage timing detection terminal), the switching control IC 84 sets the OUT terminal to a high level. As a result, the low side switching element Q1 is turned on. The OUT terminal of the switching control IC 84 is connected to a control terminal of the low side switching element Q1 via a resistor R12.

The constant current circuit CC1 charges the capacitor Cb1 with a constant current through a voltage at the OUT terminal of the switching control IC 84. A comparator in the switching control IC 84 compares a voltage at the capacitor Cb1 with a voltage at the FB terminal, and upon a voltage at the IS terminal exceeding the voltage at the FB terminal, the switching control IC 84 switches the voltage at the OUT terminal from the high level to a low level. Thus, as the voltage at the FB terminal is lower, the charge time in the capacitor Cb1 decreases. In other words, an on time of the low side switching element Q1 becomes shorter, and the output voltage Vo is thus turned into a constant voltage.

Note that a diode D9 defines a discharge path of an electric charge from the capacitor Cb1. In other words, when the output voltage of the switching control IC 84 is brought to the low level (when Q1 is turned off), an electric charge in the capacitor Cb1 is discharged via the diode D9.

In this manner, the circuit including the switching control IC 84, which is a current mode IC, the constant current circuit CC1, and the capacitor Cb1 functions as a voltage-time conversion circuit. Then, a voltage of a feedback signal, which is generated by detecting the output voltage Vo and comparing the output voltage Vo with the reference voltage (target voltage), is converted in the voltage-time conversion circuit, and the low side switching element Q1 is turned on for a period equivalent to the obtained time.

A second switching control circuit 61 is provided between the high side drive winding nb2 of the transformer T and the high side switching element Q2. The second switching control circuit 61 corresponds to a "high side switching element control circuit" in the appended claims. Specifically, a first end of the high side drive winding nb2 of the transformer T is connected to a node between the low side switching element Q1 and the high side switching element Q2 (source terminal of the high side switching element Q2), and the second switching control circuit 61 is connected between a second end of the high side drive winding nb2 and a gate terminal of the high side switching element Q2.

As will be described subsequently, the second switching control circuit 61 forces the high side switching element Q2 to turn off when a period that is equivalent to an on time of the low side switching element Q1 has elapsed after the high side switching element Q2 is turned on.

The second switching control circuit 61 is a bidirectional constant current circuit that preferably includes a diode bridge rectifying circuit, which preferably includes four diodes D1, D2, D3, and D4, and a constant current circuit CC2, which is connected between a node between the diodes D1 and D3 and a node between the diodes D2 and D4, or in other words, connected between output ports of the diode bridge rectifying circuit.

When the low side switching element Q1 is turned on, a negative voltage induced in the high side drive winding nb2 causes a capacitor Cb2 to discharge with a constant current in a negative direction along a path defined by the capacitor Cb2, the diode D3, the constant current circuit CC2, the diode D2, and the high side drive winding nb2 in that order.

Thereafter, when the low side switching element Q1 is turned off, a positive voltage induced in the high side drive winding nb2 causes a positive voltage to be applied to the high side switching element Q2 via a resistor R5, and thus Q2 is turned on. In addition, the capacitor Cb2 is charged with a constant current in a positive direction along a path defined by the high side drive winding nb2, the diode D1, the constant current circuit CC2, the diode D4, and the capacitor Cb2 in that order. At a point in time when the voltage at the capacitor Cb2 exceeds a threshold voltage of a transistor, which preferably is approximately 0.6 V, for example, a transistor ("switching element" in the appended claims) Q3 is turned on, and in turn the high side switching element Q2 is turned off.

Through the operation described above, the discharge time of the capacitor Cb2, or in other words, the on time of the low side switching element Q1 becomes equal or substantially equal to the charge time of the capacitor Cb2, or in other words, the on time of the high side switching element Q2.

Figure 3:
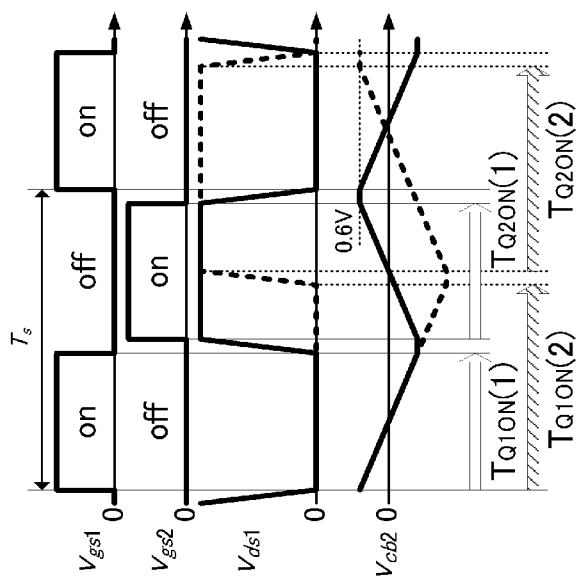
FIG. 3 is a waveform diagram illustrating a relationship among a voltage Vgs1 between a gate and a source of a low side switching element Q1, a voltage Vgs2 between a gate and a source of a high side switching element Q2, a voltage Vds1 between a drain and the source of the low side switching element Q1, and a voltage Vcb2 at a capacitor Cb2.

FIG. 3 is a waveform diagram illustrating a relationship among a voltage Vgs1 between a gate and a source of the low side switching element Q1, a voltage Vgs2 between a gate and a source of the high side switching element Q2, a voltage Vds1 between the drain and the source of the low side switching element Q1, and a voltage Vcb2 of the capacitor Cb2.

Upon the low side switching element Q1 being turned on, a negative voltage is induced in the high side drive winding nb2, and the charge voltage Vcb2 of the capacitor Cb2 starts to fall from the threshold voltage of approximately 0.6 V, for example. Thereafter, upon the low side switching element Q1 being turned off, a positive voltage is induced in the high side drive winding nb2, and the charge voltage Vcb2 of the capacitor Cb2 starts to rise. When the charge voltage Vcb2 of the capacitor Cb2 exceeds the threshold voltage of approximately 0.6 V, for example, the transistor Q3 is turned on. As a result, a gate potential of the high side switching element Q2 becomes 0 V, and the high side switching element Q2 is thus turned off. Since the capacitor Cb2 is charged and discharged with a constant current of the same current value, the gradient of the charge voltage Vcb2 is even. In other words, a charge and discharge current ratio Di is 1:1. Accordingly, the on time of the high side switching element Q2 is equal or substantially equal to the on time of the low side switching element Q1.

In FIG. 3, $T_{Q1ON}(1)$ is equal to $T_{Q2ON}(1)$ through the operation described above. Here, when the on time of the low side switching element Q1 increases to $T_{Q1ON}(2)$, Vds1 and Vcb2 take on respective waveforms as indicated by the dotted lines. At this time as well, $T_{Q1ON}(2)$ is equal to $T_{Q2ON}(2)$ through the operation described above.

Figure 4:
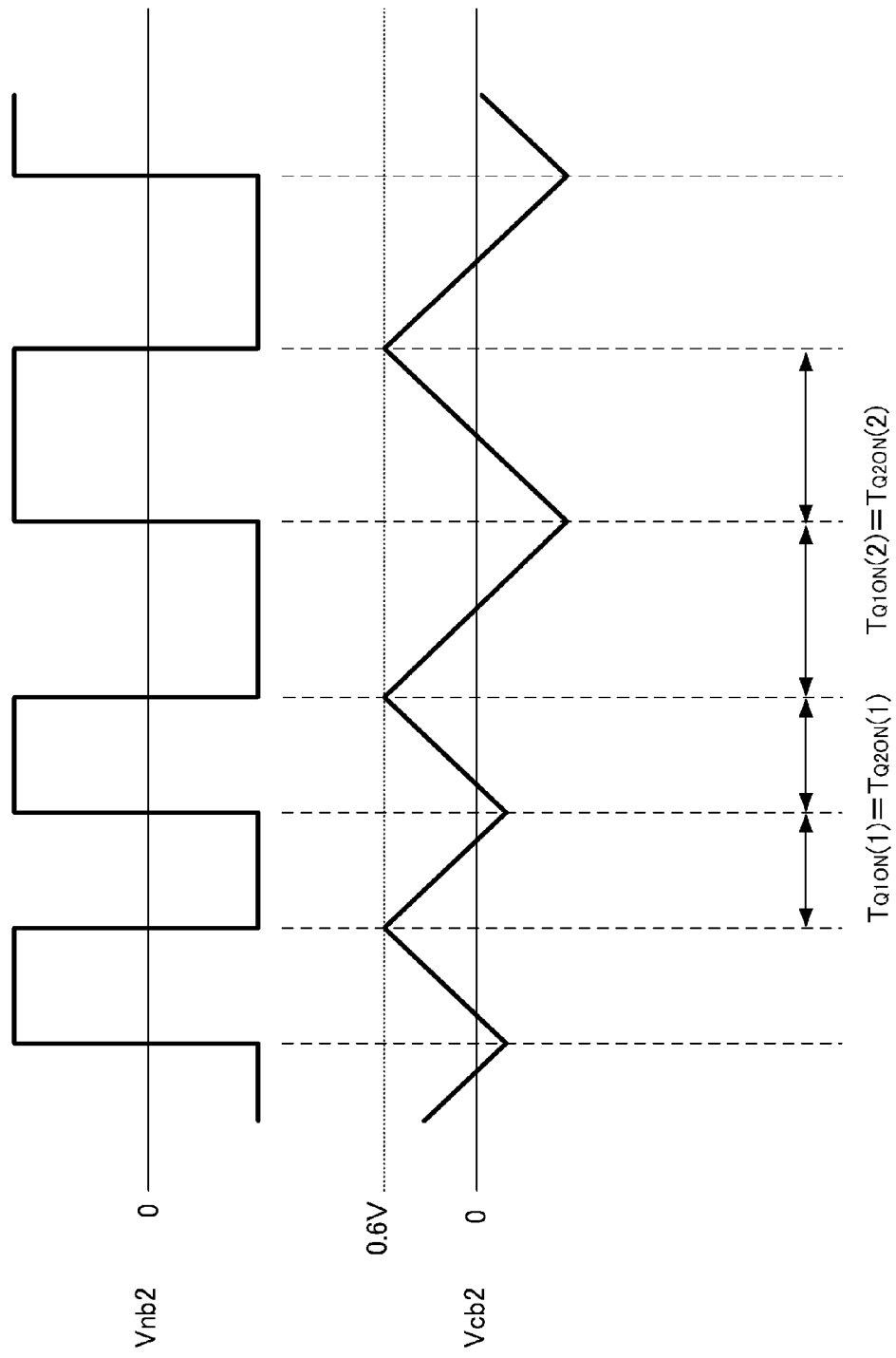
FIG. 4 is a waveform diagram illustrating a relationship between a voltage Vnb2 at a high side drive winding nb2 and the voltage Vcb2 at the capacitor Cb2.

FIG. 4 is a waveform diagram illustrating a relationship between a voltage Vnb2 of the high side drive winding nb2 and the voltage Vcb2 of the capacitor Cb2.

In this manner, as the on time of the low side switching element Q1 changes, the on time of the high side switching element Q2 follows such a change and changes accordingly.

Note that as an electric charge is discharged from the capacitor Cb2, a reverse bias voltage is applied between a base and an emitter of the transistor Q3. A typical transistor, however, normally has a withstanding voltage of up to approximately −5 V and is thus capable of charging or discharging within a wide range of, for example, about −4 V to about 0.6 V even with a design margin taken in consideration. If the range of a variation in the voltage at the capacitor Cb2 is increased, a permissible amount of external disturbance noise increases. In addition, and an error against a temperature change, a variation in the electrical characteristics of a component, and so on is reduced, which enables a stable operation.

According to the first preferred embodiment, a voltage-time conversion circuit can be provided only by using a so-called current mode IC and providing, outside the current mode IC, a constant current circuit that charges a capacitor with a constant or substantially constant current on the basis of a drive voltage signal of the low side switching element Q1. Thus, the on time of the low side switching element Q1 is controlled in accordance with a feedback voltage, and the configuration of the entire circuit is simplified.

Aside from the above, the following advantageous effects are obtained.

The low side switching element Q1 and the high side switching element Q2 preferably are turned on or off in an alternating manner with symmetric waveforms while having the same or substantially the same amount of on time.

A circuit for detection of the on time of the low side switching element Q1 and turning on and off the high side switching element Q2 preferably are integrated into a single entity, and the second switching control circuit is defined by a minimum number of discrete components.

A potential at a ground terminal that is connected to the primary winding of the transformer T of the high side switching element Q2 varies along with switching of the low side switching element Q1, but the second switching control circuit is a circuit that operates by using an alternate current voltage that is generated in the high side drive winding nb2. Therefore, a malfunction is less likely to occur regardless of the variation in the potential at the ground terminal.

The low side switching element Q1 and the high side switching element Q2 are turned on by using a change in the voltage that is generated in a transformer winding as a trigger and are turned on or off in an alternating manner with a minimum dead time. In other words, the two switching elements are not in the on state at the same time, and thus high reliability is ensured. In addition, the dead time takes a minimum value that achieves a ZVS (zero voltage switching) operation, and thus high power conversion efficiency is obtained.

Second Preferred Embodiment

Figure 5:
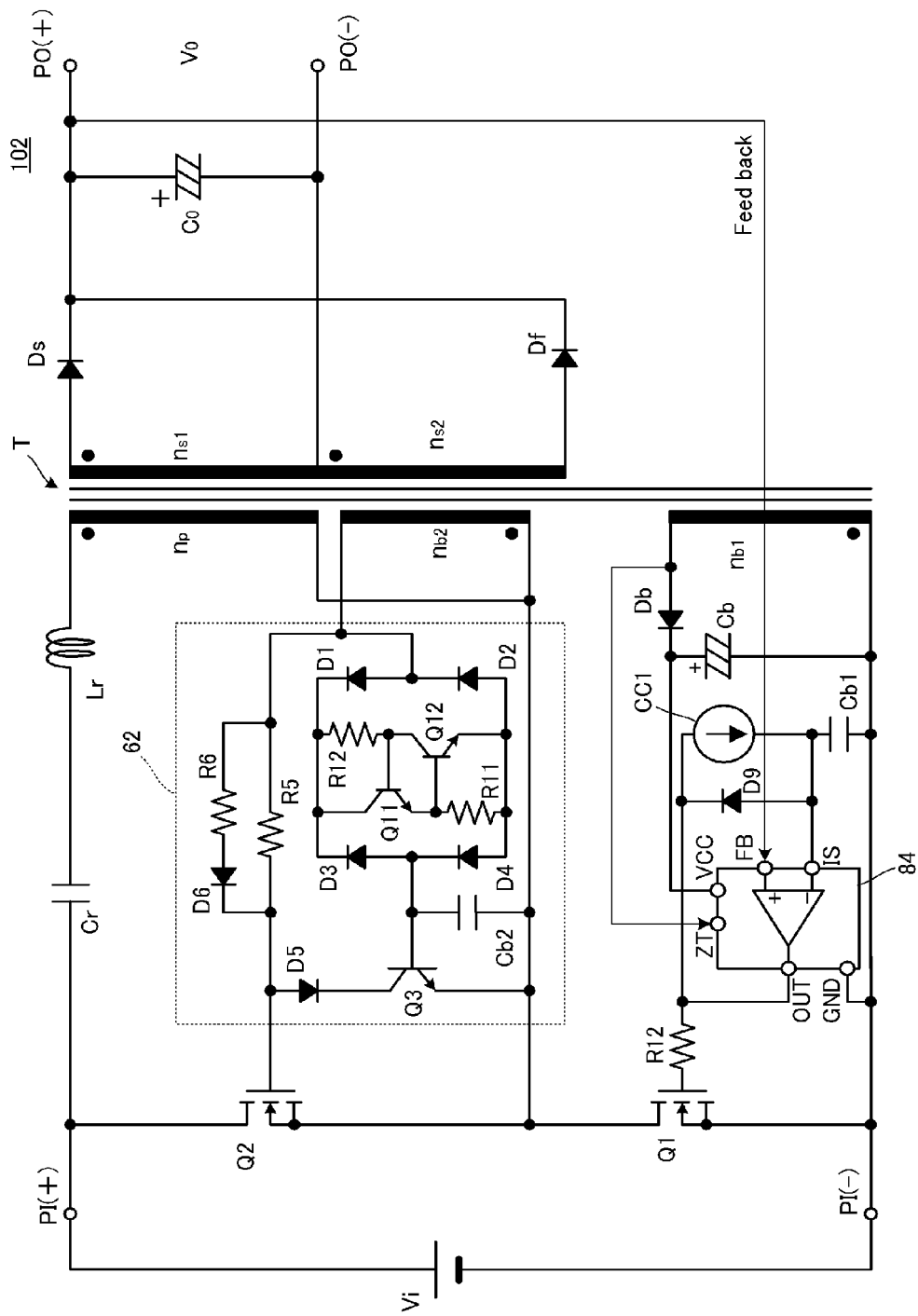
FIG. 5 is a circuit diagram of a switching power supply device 102 according to a second preferred embodiment of the present invention.

FIG. 5 is a circuit diagram of a switching power supply device 102 according to a second preferred embodiment of the present invention.

The switching power supply device 102 differs from the switching power supply device 101 illustrated in FIG. 2 in terms of the configuration of a second switching control circuit 62. A constant current circuit is depicted with more details in the example illustrated in FIG. 5. Specifically, a base of a first transistor Q11 is connected to a collector of a second transistor Q12; an emitter of the first transistor Q11 is connected to a base of the second transistor Q12; a resistor R12 is connected between a collector and the base of the first transistor Q11; and a resistor R11 is connected between an emitter and the base of the second transistor Q12. Thus, a single constant current circuit is provided.

According to this configuration, the second switching control circuit is defined by a minimum number of discrete components.

Note that, in the example illustrated in FIG. 5, a series circuit, which preferably includes a resistor R6 and a diode D6, is connected in parallel to the resistor R5. Thus, a difference in impedance preferably is generated by differentiating a charge path used when charging the input capacitance of the high side switching element Q2 with an electric charge through a voltage generated in the high side drive winding nb2 and thus turning on the high side switching element Q2 from a discharge path used when discharging an electric charge from the input capacitance of the high side switching element Q2. This allows such a design in which a delay time from a point in time when a change in the voltage occurs in the high side drive winding nb2 is adjusted and the high side switching element Q2 is turned on at an optimal timing.

Third Preferred Embodiment

Figure 6:
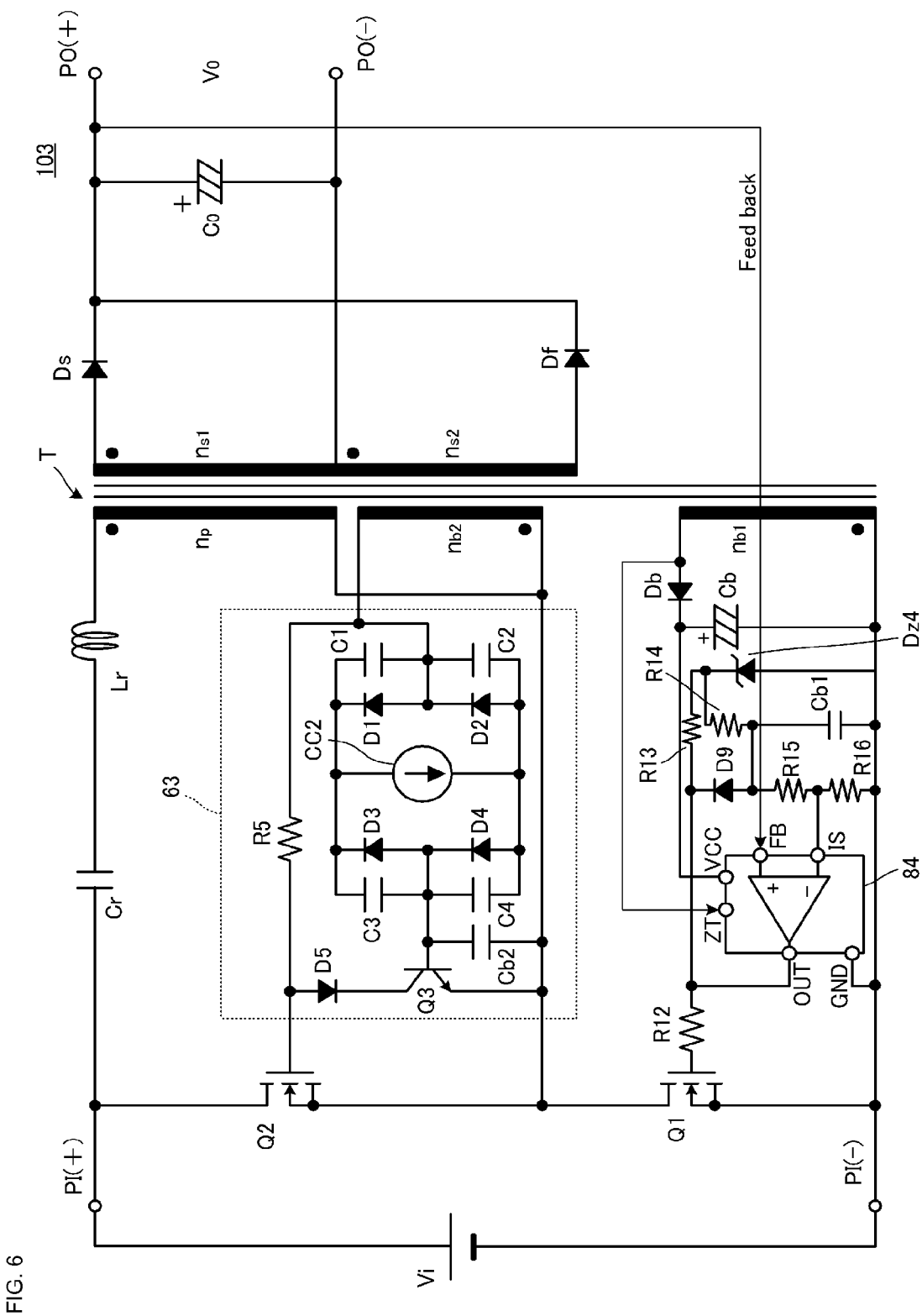
FIG. 6 is a circuit diagram of a switching power supply device 103 according to a third preferred embodiment of the present invention.

FIG. 6 is a circuit diagram of a switching power supply device 103 according to a third preferred embodiment of the present invention.

The switching power supply device 103 differs from the switching power supply device 101 illustrated in FIG. 2 in terms of the configuration of a switching control circuit at the low side and the configuration of a second switching control circuit 63.

In the switching control circuit at the low side according to this preferred embodiment, a constant voltage circuit, which preferably includes a resistor R13 and a Zener diode Dz4, is provided at the OUT terminal of the switching control IC 84. A time constant circuit, which preferably includes a resistor R14 and the capacitor Cb1, is connected to the Zener diode Dz4. A resistive divider circuit, which preferably includes resistors R15 and R16, is connected between the two ends of the capacitor Cb1. An output voltage of this resistive divider circuit is input to the IS terminal of the switching control IC 84.

In this manner, the time constant circuit may be charged with a constant voltage. In addition, the voltage at the capacitor Cb1 serving to set a time constant may be divided through resistors and input to the IS terminal of the switching control IC.

In the second switching control circuit 63 according to this preferred embodiment, capacitors C1, C2, C3, and C4 are connected in parallel to the diodes D1, D2, D3, and D4, respectively.

In this manner, connecting the capacitors in parallel to the respective diodes that rectify currents input to and output from the constant current circuit CC2 makes it possible to accumulate electric charges in the capacitors C1, C2, C3, and C4 during a period in which a reverse voltage is applied to a rectifying diode and to discharge electric charges accumulated in the capacitors C1, C2, C3, and C4 during a dead time in which a voltage at the high side drive winding nb2 changes. As a result, a current can be made to flow with a leading phase relative to the diodes. This makes it possible to adjust an amount of current charged to or discharged from the capacitor Cb2, and distortion of a charge or discharge current generated during a dead time, or in particular, generated while the direction of the current being charged to or discharged from the capacitor Cb2 changes is corrected. Note that the capacitors do not necessarily have to be connected in parallel to all of the respective diodes D1 to D4, and the distortion of the charge or discharge current can be corrected as long as a capacitor is connected in parallel to at least one of the diodes D1 to D4.

Fourth Preferred Embodiment

Figure 7:
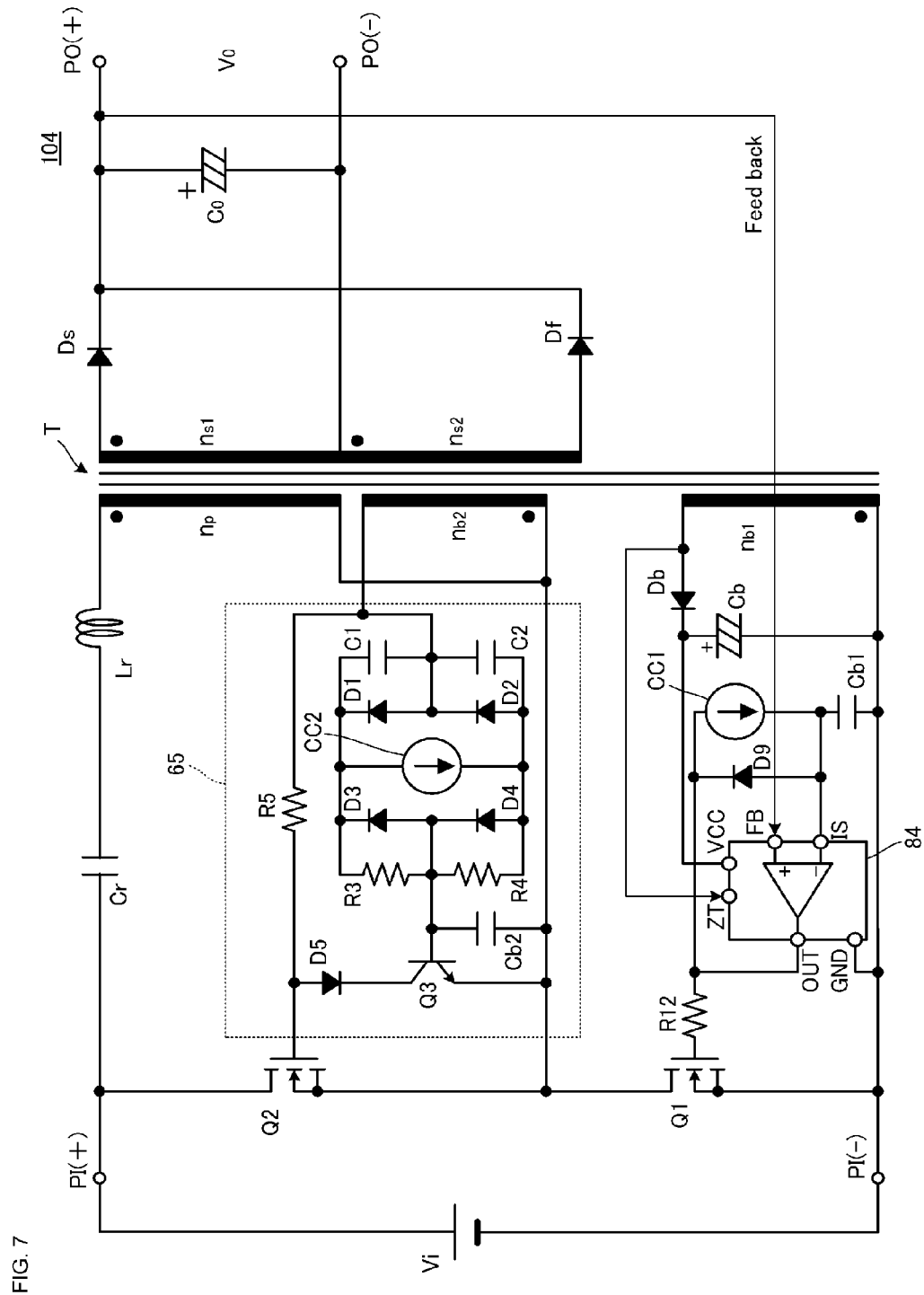
FIG. 7 is a circuit diagram of a switching power supply device 104 according to a fourth preferred embodiment of the present invention.

FIG. 7 is a circuit diagram of a switching power supply device 104 according to a fourth preferred embodiment of the present invention.

The switching power supply device 104 differs from the switching power supply device 101 illustrated in FIG. 2 in terms of the configuration of a second switching control circuit 65. In this example, the capacitors C1 and C2 are connected in parallel to the diodes D1 and D2, respectively. In addition, resistors R3 and R4 are connected in parallel to the diodes D3 and D4, respectively.

Creating a difference in the resistance values of the respective resistors R3 and R4 makes it possible to create a difference in impedance (time constant) between a charge path to and a discharge path from the capacitor Cb2. Thus, a slight difference in the on times between the low side switching element Q1 and the high side switching element Q2 is corrected. In addition, adjusting the resistance value by using the resistors R3 and R4 makes it possible to correct a slight difference in the on time which is required when an input voltage or on output voltage changes. In other words, the resistance value is adjusted by using the resistors R3 and R4 while making use of a change in the voltage at the high side drive winding nb2. A current that is determined by the voltage at the high side drive winding nb2 and the resistor R3 or R4 is added to a current that is determined by the constant current circuit so as to be superimposed thereon, and the result is then set as a current to be charged to or discharged from the capacitor Cb2. Thus, correction is made when an input or output voltage changes. As a result, the on times of the low side switching element Q1 and of the high side switching element Q2 can be made equal in duration with higher precision. Note that a resistor may be connected in parallel to at least one of the diodes D1 to D4. Note also that a capacitor may be connected at a location at which a resistor is not connected in parallel to a diode.

Fifth Preferred Embodiment

Figure 8:
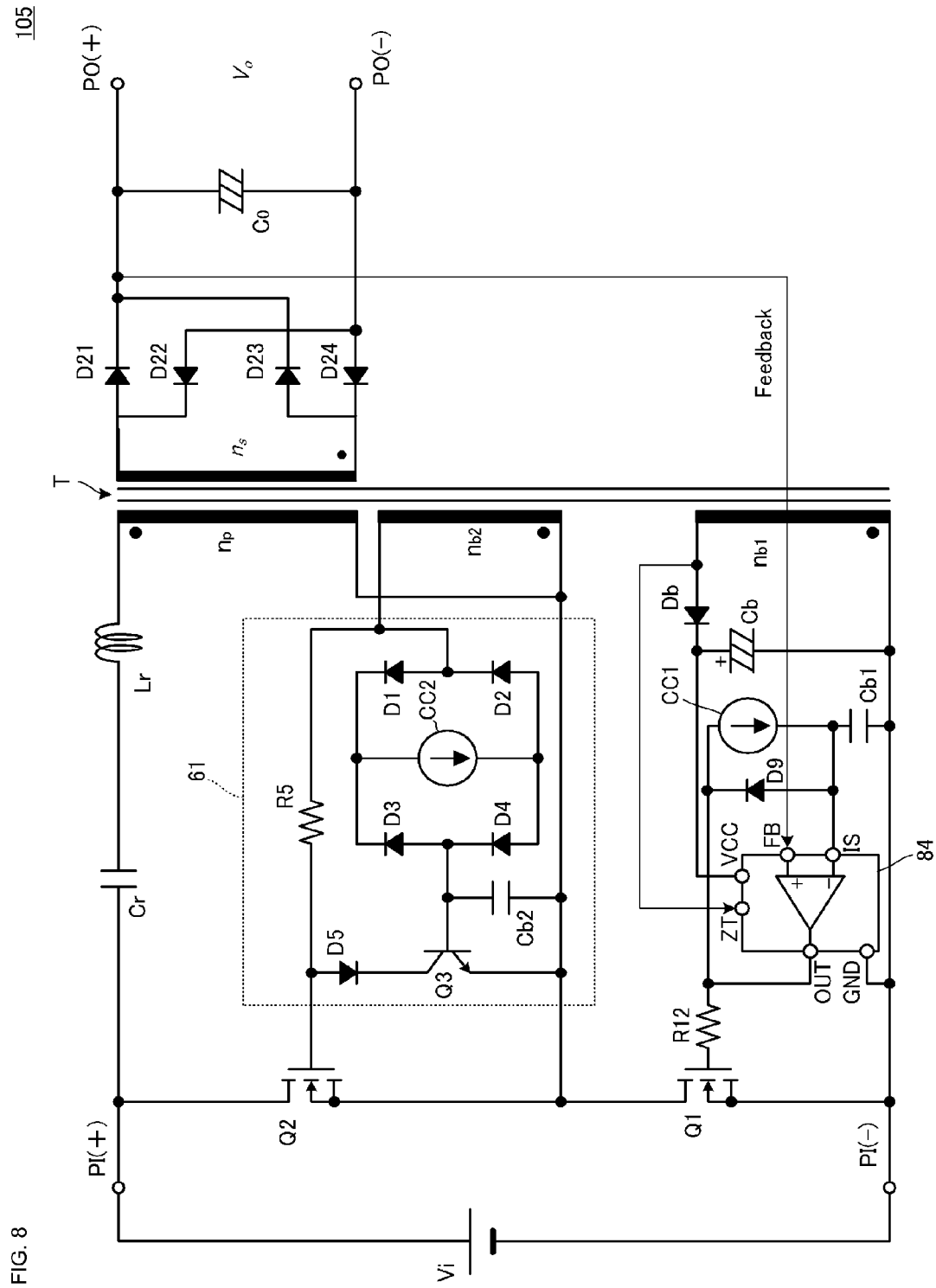
FIG. 8 is a circuit diagram of a switching power supply device 105 according to a fifth preferred embodiment of the present invention.

FIG. 8 is a circuit diagram of a switching power supply device 105 according to a fifth preferred embodiment of the present invention.

The switching power supply device 105 differs from the switching power supply device of the first preferred embodiment illustrated in FIG. 2 in terms of the configuration of the transformer T at the secondary side.

In the fifth preferred embodiment, a diode bridge circuit, which is formed by diodes D21, D22, D23, and D24, and the capacitor Co are connected to a secondary winding ns of the transformer T.

In this manner, the full waves may be rectified by the diode bridge circuit.

Sixth Preferred Embodiment

Figure 9:
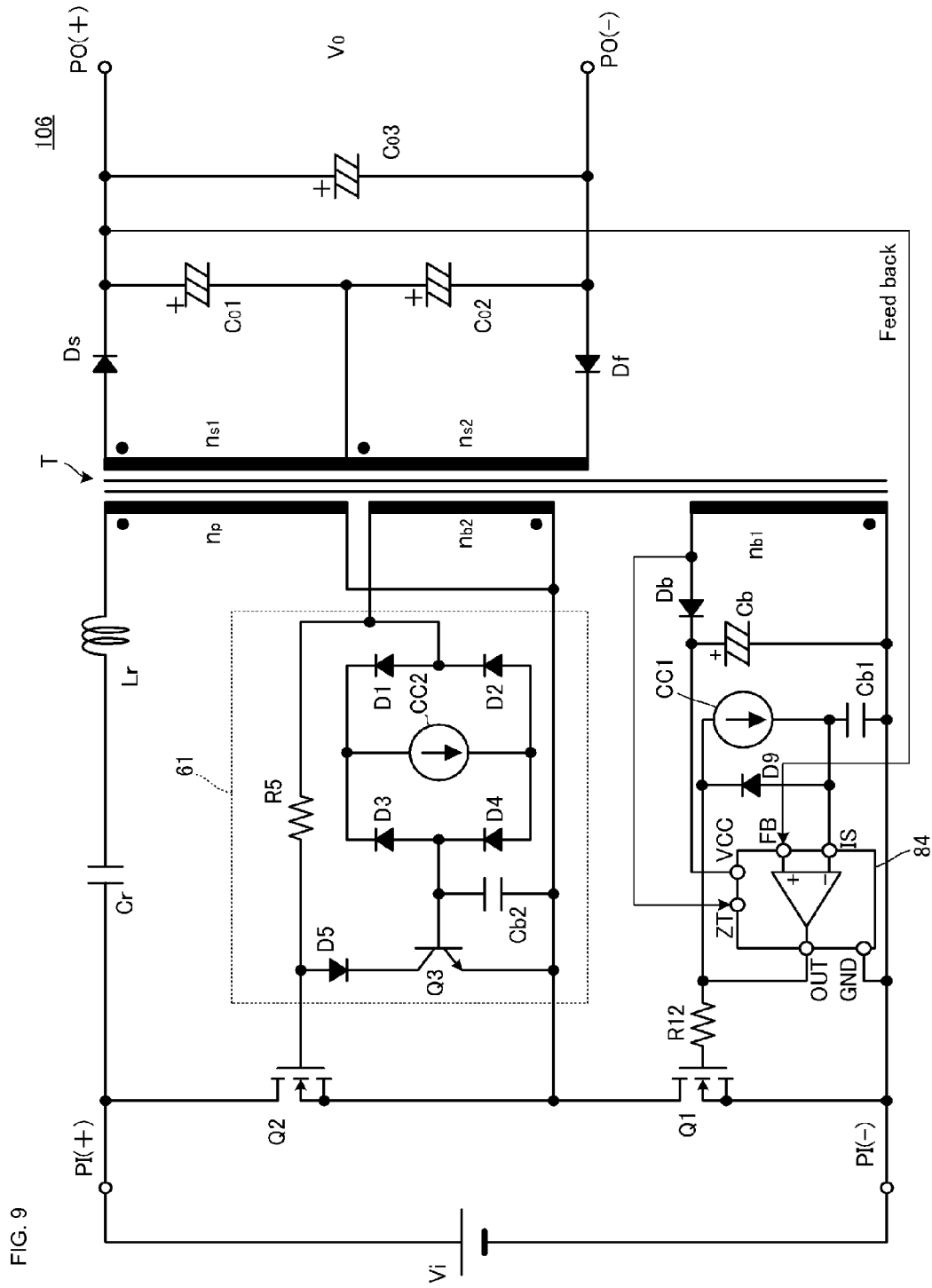
FIG. 9 is a circuit diagram of a switching power supply device 106 according to a sixth preferred embodiment of the present invention.

FIG. 9 is a circuit diagram of a switching power supply device 106 according to a sixth preferred embodiment of the present invention.

The switching power supply device 106 differs from the switching power supply device of the first preferred embodiment illustrated in FIG. 2 in terms of the configuration of the transformer T at the secondary side.

In the sixth preferred embodiment, the diode Ds and the capacitor Co1 and the diode Df and the capacitor Co2 are connected respectively between the two ends of the respective secondary windings ns1 and ns2 of the transformer T, and a node between the capacitors Co1 and Co2 is connected to a node between the secondary windings ns1 and ns2. In addition, a capacitor Co3 is connected between the output terminals PO(+) and PO(−).

In this manner, a voltage doubling rectifying circuit is provided.

Seventh Preferred Embodiment

Figure 10:
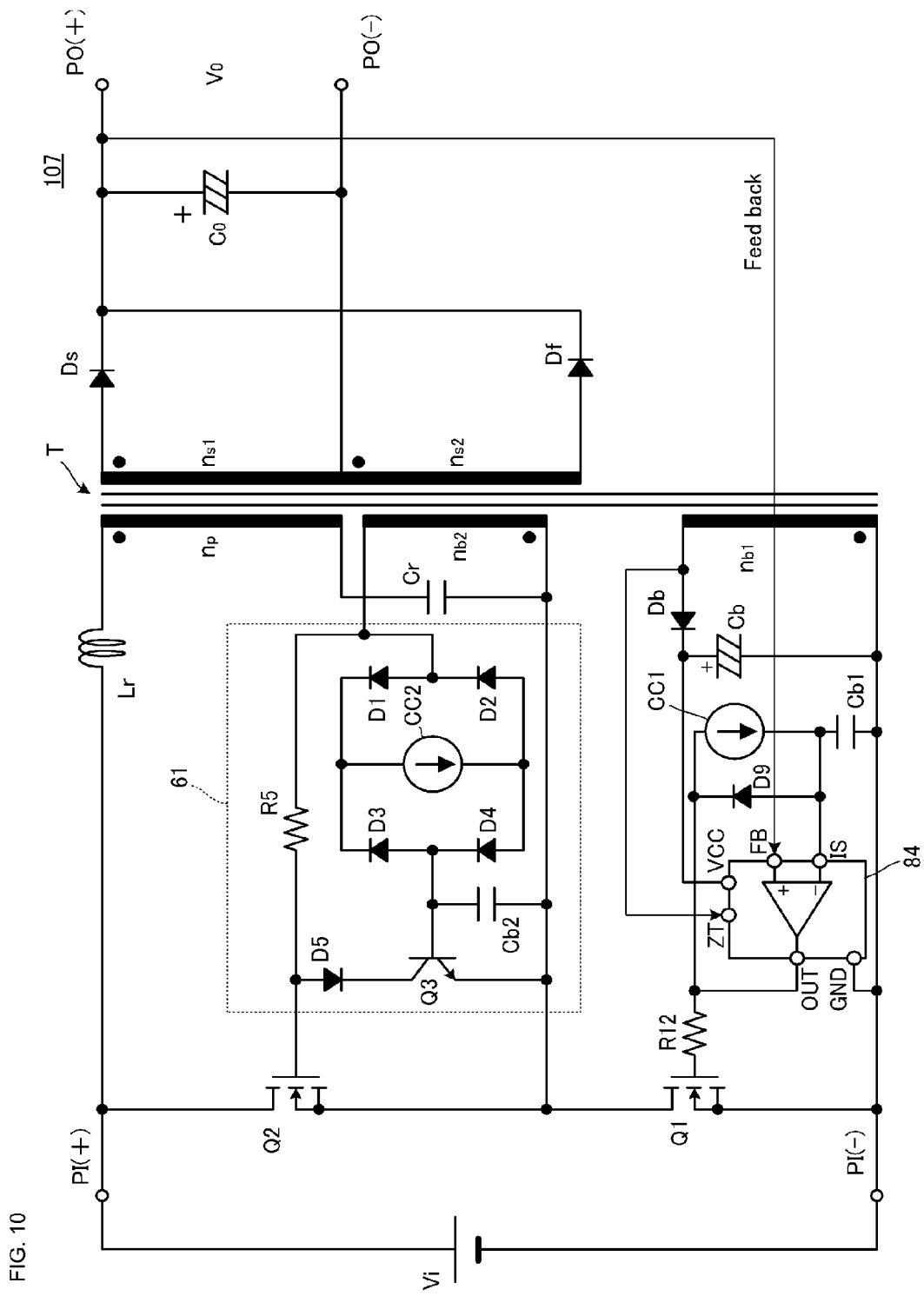
FIG. 10 is a circuit diagram of a switching power supply device 107 according to a seventh preferred embodiment of the present invention.

FIG. 10 is a circuit diagram of a switching power supply device 107 according to a seventh preferred embodiment of the present invention.

The switching power supply device 107 differs from the switching power supply device of the first preferred embodiment illustrated in FIG. 2 in terms of the location of the capacitor Cr.

The resonance capacitor Cr may be disposed at any location along a path of a current that flows toward the inductor Lr when the low side switching element Q1 is turned off. Thus, as illustrated in FIG. 10, the capacitor Cr preferably is connected between one end of the primary winding np and the source of the high side switching element Q2.

Eighth Preferred Embodiment

Figure 11:
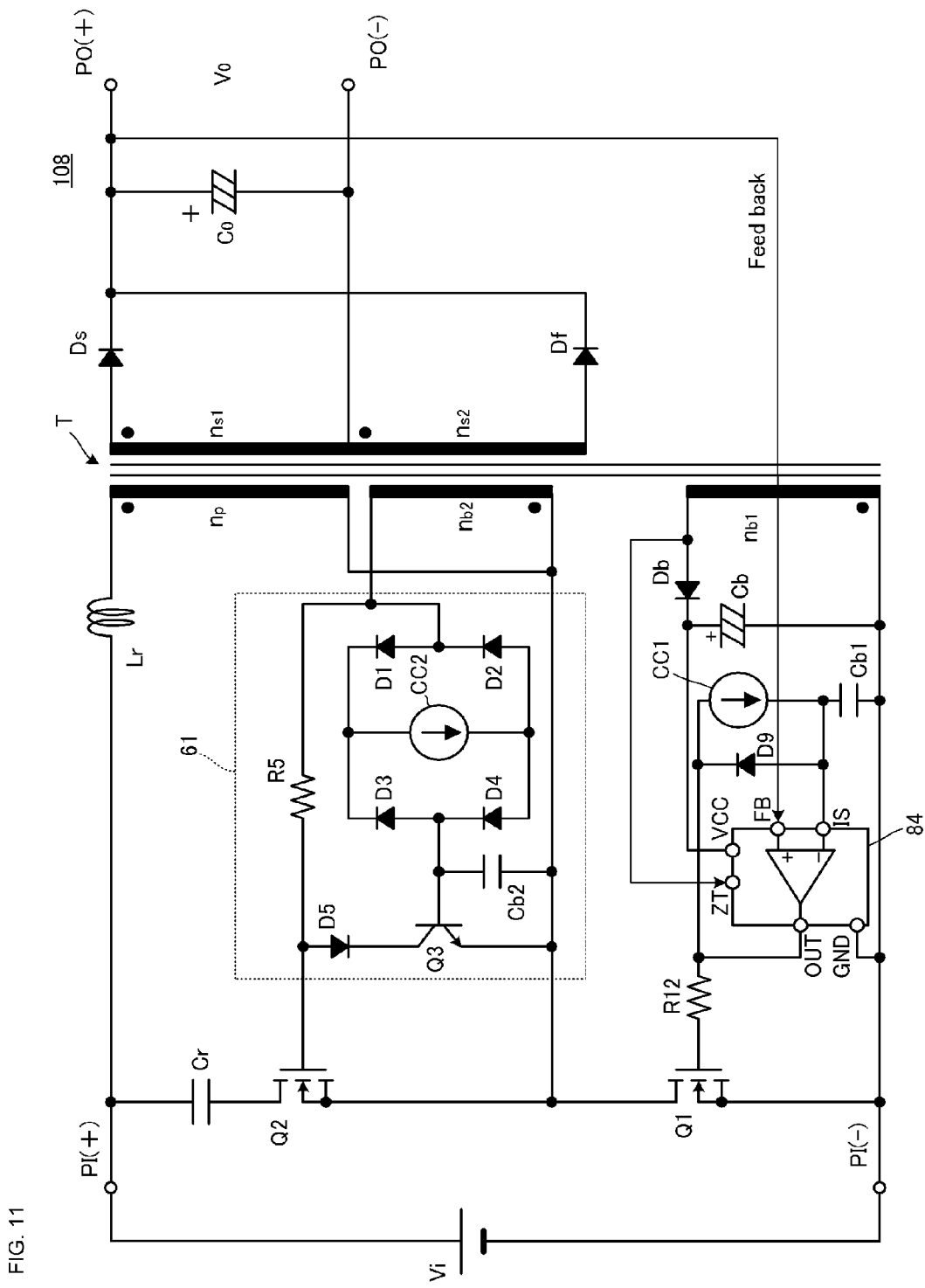
FIG. 11 is a circuit diagram of a switching power supply device 108 according to an eighth preferred embodiment of the present invention.

FIG. 11 is a circuit diagram of a switching power supply device 108 according to an eighth preferred embodiment of the present invention.

The switching power supply device 108 differs from the switching power supply device of the first preferred embodiment illustrated in FIG. 2 in terms of the location of the capacitor Cr.

The resonance capacitor Cr may be disposed at any location along a path of a current that flows toward the inductor Lr when the low side switching element Q1 is turned off. Thus, as illustrated in FIG. 11, the capacitor Cr preferably is connected between the drain of the high side switching element Q2 and the input terminal PI(+).

Ninth Preferred Embodiment

Figure 12:
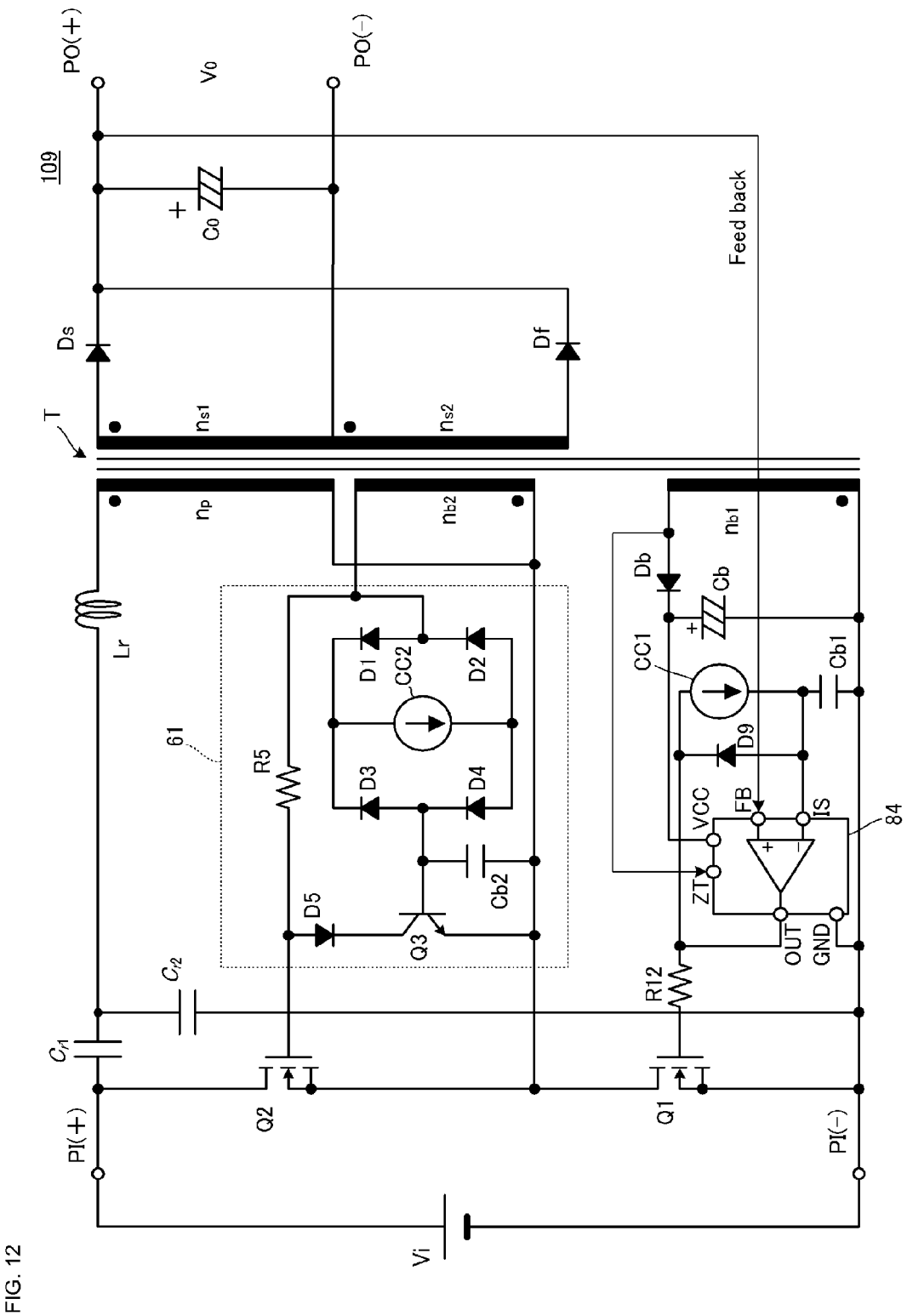
FIG. 12 is a circuit diagram of a switching power supply device 109 according to a ninth preferred embodiment of the present invention.

FIG. 12 is a circuit diagram of a switching power supply device 109 according to a ninth preferred embodiment of the present invention.

The switching power supply device 109 differs from the switching power supply device of the first preferred embodiment illustrated in FIG. 2 in that a series circuit, which preferably includes a capacitor Cr1 and the inductor Lr, is provided between the drain of the switching element Q2 and one end of the primary winding np of the transformer T and a capacitor Cr2 is provided between a node between the capacitor Cr1 and the inductor Lr and a ground line as well.

The capacitor Cr1 is arranged such that the inductor Lr, the primary winding np, the high side switching element Q2, and the capacitor Cr1 define a closed loop. In addition, Cr2 is connected in series to the high side switching element Q2 and the capacitor Cr1.

In this manner, connecting the capacitor Cr2 allows a current supplied from the power supply voltage Vi to flow during the on time of the low side switching element Q1 as well as during the on time of the high side switching element Q2. Such a configuration reduces an effective current of the current supplied from the power supply voltage Vi as compared with a circuit configuration in which the current flows only during the on time of the low side switching element Q1. Thus, a conduction loss of the current supplied from the power supply voltage Vi is significantly reduced.

Tenth Preferred Embodiment

Figure 13:
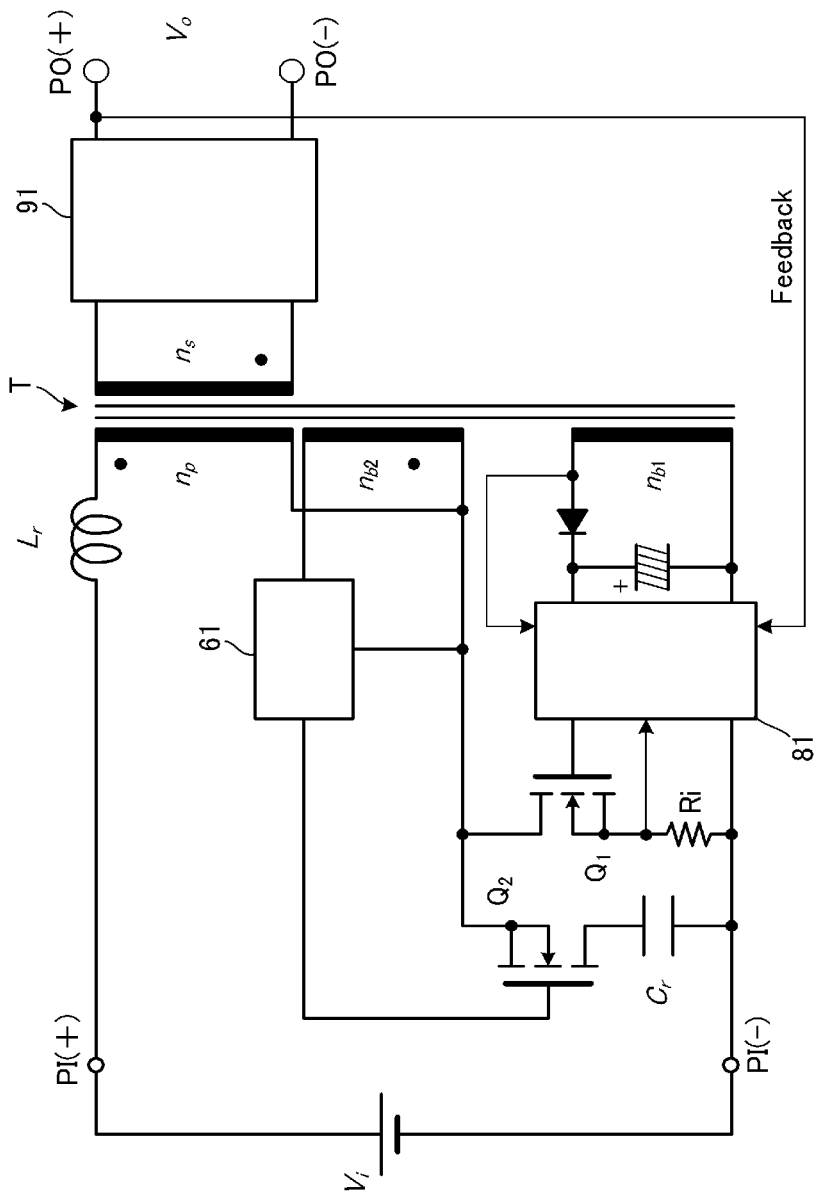
FIG. 13 is a circuit diagram of a switching power supply device 110 according to a tenth preferred embodiment of the present invention.

FIG. 13 is a circuit diagram of a switching power supply device 110 according to a tenth preferred embodiment of the present invention.

The switching power supply device 110 differs from the switching power supply device of the first preferred embodiment illustrated in FIG. 2 in terms of the locations of the high side switching element Q2 and the capacitor Cr.

The resonance capacitor Cr may be disposed at any location along a path of a current that flows toward the inductor Lr when the low side switching element Q1 is turned off. Thus, as illustrated in FIG. 13, the capacitor Cr preferably is connected between the drain of the high side switching element Q2 and the input terminal PI(−).

Eleventh Preferred Embodiment

Figure 14:
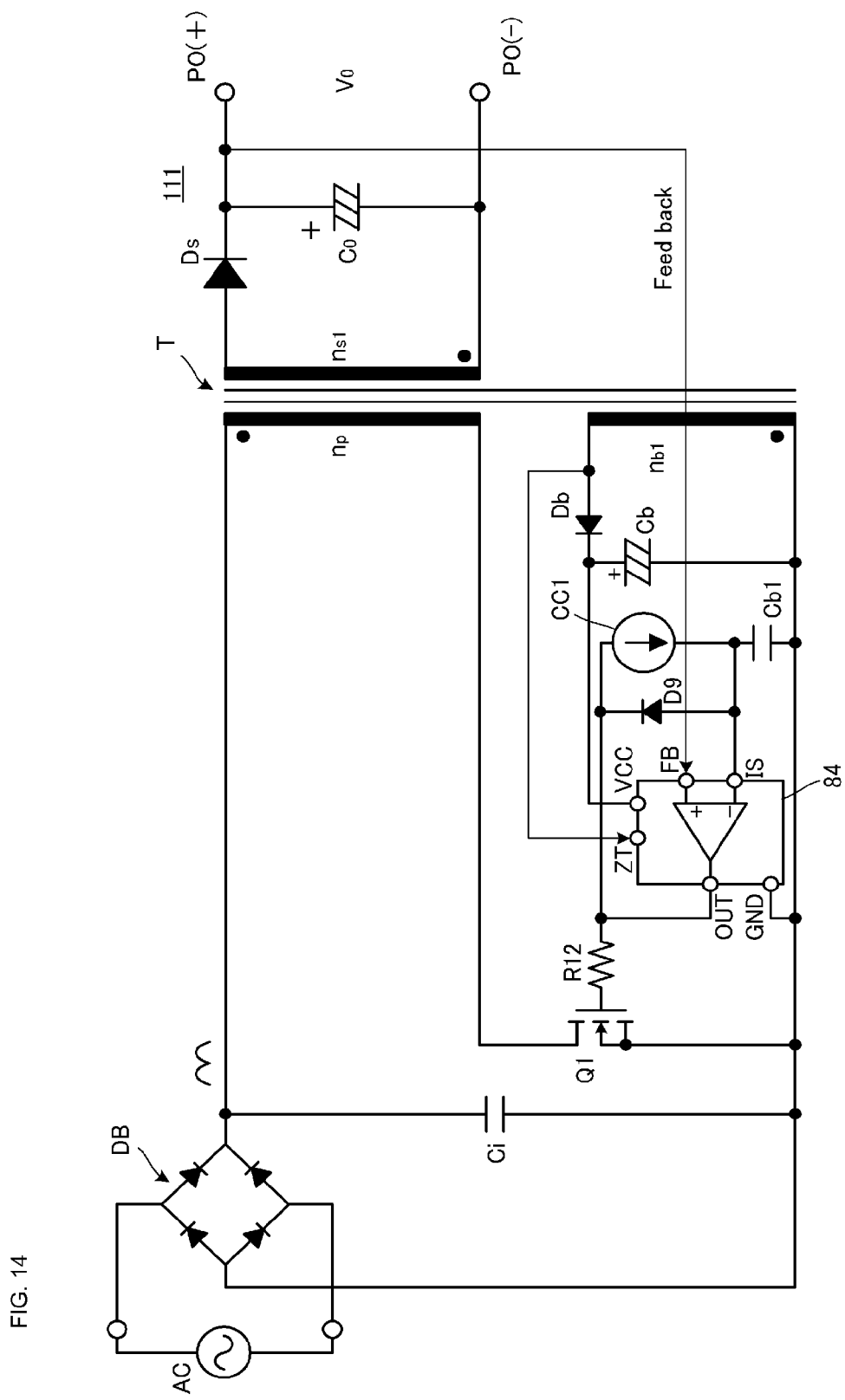
FIG. 14 is a circuit diagram of a switching power supply device 111 according to an eleventh preferred embodiment of the present invention.

FIG. 14 is a circuit diagram of a switching power supply device 111 according to an eleventh preferred embodiment of the present invention. The switching power supply device 111 functions as a power factor correction converter (PFC converter).

The switching power supply device 111 includes a diode bridge circuit DB that accepts input of an alternate current voltage of a commercial alternate current power supply AC and rectifies the full waves thereof. The switching power supply device 111 further includes a capacitor Ci, which serves as a low pass filter. The low side switching element Q1 preferably includes an FET, and the drain terminal of the low side switching element Q1 is connected to the primary winding np of the transformer T. A rectifying smoothing circuit, which preferably includes the diode Ds and the capacitor Co, is provided at the secondary winding ns1 of the transformer T. This rectifying smoothing circuit rectifies and smoothes an alternate current voltage output from the secondary winding ns1 and outputs the result to the output terminals PO(+) and PO(−).

Another rectifying smoothing circuit, which preferably includes a diode Db and a capacitor Cb, is connected to the low side drive winding nb1 of the transformer T. A direct current voltage obtained through this rectifying smoothing circuit is supplied to the VCC terminal of the switching control IC 84 as a power supply voltage.

A feedback circuit is provided between the output terminals PO(+) and PO(−) and the switching control IC 84. In FIG. 14, only a feedback path is indicated simply by a single line (Feed back).

A series circuit, which preferably includes the constant current circuit CC1 and the capacitor Cb1, is connected to the OUT terminal of the switching control IC 84 such that a charge voltage of the capacitor Cb1 is output to the IS terminal (current detection terminal).

The switching control circuit that is connected to the gate of the low side switching element Q1 preferably is identical to the one described in the first preferred embodiment.

If the charge voltage of the capacitor Cb1 is currently lower than the voltage output to the FB terminal, the OUT terminal is set to the high level, and the switching element Q1 is turned off. In addition, the voltage at the OUT terminal at the high level is applied to the constant current circuit CC1, and the capacitor Cb1 is thus charged with a constant current. If the potential at the capacitor Cb1 exceeds the potential at the FB terminal, the OUT terminal is inverted to the low level. As a result, the switching element Q1 is turned off. In addition, the electric charge in the capacitor Cb1 is discharged via the diode D9.

Thereafter, if the potential at the IS terminal falls below the potential at the FB terminal due to the electric charge discharge from the capacitor Cb1, the OUT terminal is set to the high level, and the switching element Q1 is thus turned on again.

Through the repetition of the operations described above, the switching element Q1 operates intermittently, and the on time thereof changes in accordance with the feedback voltage. The on time of the switching element Q1 is constant at a frequency in the range of the frequency of the commercial alternate current power supply. Therefore, a peak value of the current that flows in the power conversion circuit changes in accordance with the variation in the output voltage of the commercial alternate current power supply, and the envelope of the peak value takes on a sinusoidal waveform. At this time, an external shape of the output current that flows in through the low pass filter takes on a sinusoidal waveform, and the output current contains little amount of harmonic current component. Thus, the converter operates as the power factor correction (PFC) converter that suppresses the harmonic current component to a great extent.

It should be noted that although a rectifying circuit including a diode is preferably provided as a circuit at the secondary side of the transformer T in each of the preferred embodiments described above, in place of the diode, a rectifying FET may be provided to rectify synchronously. As a result, a loss in the secondary side circuit is significantly reduced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply device, comprising:
 a power supply voltage input unit configured to accept input of an input power supply voltage;
 a direct current voltage output unit configured to receive output of a direct current voltage;
 a transformer including a primary winding and a secondary winding;
 a low side switching element connected in series to the primary winding and configured to apply a voltage at the power supply voltage input unit to the primary winding upon being turned on;
 a switching control circuit configured to control the low side switching element; and
 a rectifying smoothing circuit configured to rectify and smooth a voltage output from the secondary winding and output an output voltage to the direct current voltage output unit; wherein
 the switching control circuit includes:
  a current-mode-controlling switching control IC that includes:
   a current detection terminal, to which a current that is supposed to flow through a power conversion circuit during an on time of a switching element in the power conversion circuit is detected as a voltage signal and is input;
   a feedback terminal;
   a zero voltage timing detection terminal; and
   a switching element control signal output terminal; wherein
   the current-mode-controlling switching control IC is configured to output a drive signal that causes the low side switching element to turn off from the switching element control signal output terminal in response to a voltage applied to the current detection terminal reaching a voltage applied to the feedback terminal;
  a feedback voltage signal generating circuit configured to generate a feedback voltage signal based on the output voltage and apply the generated feedback voltage signal to the feedback terminal;

a drive voltage signal output unit configured to receive a signal input to the zero voltage timing detection terminal and output, upon detecting an inversion of a voltage polarity in the transformer, a drive voltage signal that causes the low side switching element to turn on; and a reference voltage generating circuit configured to generate a reference voltage of which a voltage increases monotonously along with a time that has elapsed since the drive voltage signal has been output and function as a voltage-time conversion circuit by inputting the generated reference voltage to the current detection terminal; and in a power conversion operation in which a current flowing through the low side switching element during an on time of the low side switching element does not increase monotonously along with the time that has elapsed, the current-mode-controlling switching control IC is used.

2. The switching power supply device according to claim 1, wherein the transformer includes a low side drive winding; and the drive voltage signal output unit is configured to detect the inversion of the voltage polarity in the transformer based on a voltage at the low side drive winding.

3. The switching power supply device according to claim 1, wherein the reference voltage generating circuit includes a capacitor and a constant current circuit configured to charge the capacitor with a constant or substantially constant current in accordance with the drive voltage signal; and a circuit configured to discharge an electric charge from the capacitor through a voltage of the drive voltage signal that causes the low side switching element to turn off is provided.

4. The switching power supply device according to claim 2, wherein the reference voltage generating circuit includes a capacitor and a constant current circuit configured to charge the capacitor with a constant or substantially constant current in accordance with the drive voltage signal; and a circuit configured to discharge an electric charge from the capacitor through a voltage of the drive voltage signal that causes the low side switching element to turn off is provided.

5. The switching power supply device according to claim 1, further comprising a full wave rectifying circuit configured to accept input of a commercial alternate current power supply voltage, to rectify full waves of the commercial alternate current power supply voltage, and to output a rectified result to the power supply voltage input unit.

6. The switching power supply device according to claim 2, further comprising a full wave rectifying circuit configured to accept input of a commercial alternate current power supply voltage, to rectify full waves of the commercial alternate current power supply voltage, and to output a rectified result to the power supply voltage input unit.

7. The switching power supply device according to claim 3, further comprising a full wave rectifying circuit configured to accept input of a commercial alternate current power supply voltage, to rectify full waves of the commercial alternate current power supply voltage, and to output a rectified result to the power supply voltage input unit.

8. The switching power supply device according to claim 4, further comprising a full wave rectifying circuit configured to accept input of a commercial alternate current power supply voltage, to rectify full waves of the commercial alternate current power supply voltage, and to output a rectified result to the power supply voltage input unit.

9. The switching power supply device according to claim 1, further comprising a high side switching element control circuit configured to control the low side switching element and a high side switching element such that each of the low side and high side switching elements is turned on or off in an alternating manner with a dead time during which the low side and high side switching elements are both turned off, wherein the transformer includes a high side drive winding.

10. The switching power supply device according to claim 2, further comprising a high side switching element control circuit configured to control the low side switching element and a high side switching element such that each of the low side and high side switching elements is turned on or off in an alternating manner with a dead time during which the low side and high side switching elements are both turned off, wherein the transformer includes a high side drive winding.

11. The switching power supply device according to claim 3, further comprising a high side switching element control circuit configured to control the low side switching element and a high side switching element such that each of the low side and high side switching elements is turned on or off in an alternating manner with a dead time during which the low side and high side switching elements are both turned off, wherein the transformer includes a high side drive winding.

12. The switching power supply device according to claim 4, further comprising a high side switching element control circuit configured to control the low side switching element and a high side switching element such that each of the low side and high side switching elements is turned on or off in an alternating manner with a dead time during which the low side and high side switching elements are both turned off, wherein the transformer includes a high side drive winding.

13. The switching power supply device according to claim 5, further comprising a high side switching element control circuit configured to control the low side switching element and a high side switching element such that each of the low side and high side switching elements is turned on or off in an alternating manner with a dead time during which the low side and high side switching elements are both turned off, wherein the transformer includes a high side drive winding.

14. The switching power supply device according to claim 6, further comprising a high side switching element control circuit configured to control the low side switching element and a high side switching element such that each of the low side and high side switching elements is turned on or off in an alternating manner with a dead time during which the low side and high side switching elements are both turned off, wherein the transformer includes a high side drive winding.

15. The switching power supply device according to claim 7, further comprising a high side switching element control circuit configured to control the low side switching element and a high side switching element such that each of the low side and high side switching elements is turned on or off in an alternating manner with a dead time during which the low side and high side switching elements are both turned off, wherein the transformer includes a high side drive winding.

16. The switching power supply device according to claim 8, further comprising a high side switching element control circuit configured to control the low side switching element and a high side switching element such that each of the low side and high side switching elements is turned on or off in an alternating manner with a dead time during which the low side and high side switching elements are both turned off, wherein the transformer includes a high side drive winding.

17. The switching power supply device according to claim 9, wherein the high side switching element control circuit includes:
- a turn on signal transmitting circuit configured to supply a voltage generated in the high side drive winding to a control terminal of the high side switching element so as to turn on the high side switching element upon the low side switching element being turned off;
- a bidirectional constant current charge-discharge circuit connected to the high side drive winding and configured to turn the voltage generated in the high side drive winding into a constant current and charge or discharge a capacitor with the constant current; and
- a switching element configured to turn off the high side switching element by shifting a state upon a voltage at the capacitor charged by a voltage induced in the high side drive winding exceeding a threshold value during an off time of the low side switching element.

18. The switching power supply device according to claim 10, wherein the high side switching element control circuit includes:
- a turn on signal transmitting circuit configured to supply a voltage generated in the high side drive winding to a control terminal of the high side switching element so as to turn on the high side switching element upon the low side switching element being turned off;
- a bidirectional constant current charge-discharge circuit connected to the high side drive winding and configured to turn the voltage generated in the high side drive winding into a constant current and charge or discharge a capacitor with the constant current; and
- a switching element configured to turn off the high side switching element by shifting a state upon a voltage at the capacitor charged by a voltage induced in the high side drive winding exceeding a threshold value during an off time of the low side switching element.

19. The switching power supply device according to claim 1, further comprising a rectifying smoothing circuit configured to rectify and smooth a voltage generated in the low side drive winding to generate a direct current power supply voltage to be supplied to the switching control circuit and provided in the low side drive winding.

* * * * *